(12) United States Patent
Wingen

(10) Patent No.: US 7,733,127 B2
(45) Date of Patent: Jun. 8, 2010

(54) CIRCUITS AND METHODS FOR COMMUNICATING DATA BETWEEN DOMAINS DURING VOLTAGE AND FREQUENCY SHIFTING

(75) Inventor: Neal Thomas Wingen, Inverness, IL (US)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 12/360,073

(22) Filed: Jan. 26, 2009

(65) Prior Publication Data

US 2009/0189639 A1    Jul. 30, 2009

Related U.S. Application Data

(60) Provisional application No. 61/023,764, filed on Jan. 25, 2008.

(51) Int. Cl.
H03K 19/0175   (2006.01)

(52) U.S. Cl. ............................... 326/80; 326/62; 326/63

(58) Field of Classification Search .................. None
See application file for complete search history.

(56) References Cited

U.S. PATENT DOCUMENTS

| 7,093,144 B2 * | 8/2006 | Skroch | 713/300 |
| 7,571,407 B2 * | 8/2009 | Nishikawa | 716/6 |

* cited by examiner

*Primary Examiner*—Anh Q Tran
(74) *Attorney, Agent, or Firm*—Thomas J. Satagaj; Seed IP Law Group PLLC

(57) ABSTRACT

When communicating data between different voltage and frequency domains, for example chiplets, in an integrated circuit, the data signals can be formatted to compensate for propagation delays and different operating frequencies between the domains, and the signaling voltage level of the formatted data signals can then be changed from the operating voltage of the transmitting domain to the operating voltage of the receiving domain so that the formatted and changed data signals can be transmitted. As such, voltage crossings are combined with frequency crossings, which can have the effect of hiding the voltage shifting within the propagation delays.

23 Claims, 5 Drawing Sheets

CIRCUITS AND METHODS FOR COMMUNICATING DATA BETWEEN DOMAINS DURING VOLTAGE AND FREQUENCY SHIFTING

CROSS-REFERENCE TO RELATED APPLICATION

This application claims priority under 35 U.S.C. §120 to a U.S. Provisional Patent Application No. 61/023,764, filed Jan. 25, 2008, entitled "CIRCUITS AND METHODS FOR COMMUNICATING DATA BETWEEN DOMAINS DURING VOLTAGE AND FREQUENCY SHIFTING," assigned to the same assignee as the present application, and incorporated herein by reference in its entirety.

BACKGROUND

1. Technical Field

The present invention relates generally to communicating data between different voltage and frequency domains within an integrated circuit chip, and to mitigating propagation delays for data communication between domains.

2. Description of the Related Art

When designing electronics, power consumption is often a critical metric. Cell phones, handheld electronics, and other battery-powered electronic devices are measured in terms of battery life and play time. Even non-battery applications are striving to be as energy-friendly as possible. One way to promote efficient power consumption is by partitioning chips into multiple voltage and frequency domains. The voltages and frequencies in the different areas of the chip can be scaled to use minimum power while still achieving performance requirements. When data is communicated between different domains having different operating voltages and frequencies, the voltage and frequency are changed from that of the transmitting domain to that of the target domain.

Exchanging data across differently clocked domains can take place using synchronous or non-synchronous transfer. To guard against corrupting the data, synchronous transfer generally involves careful clock balancing across voltages and frequencies. In some cases, synchronous transfer implementations can use a negative edge to transfer the data, but the switching speeds provided by negative edge triggered flip-flops may not always be sufficient.

Non-synchronous data transfer across different voltage and frequency domains includes source-synchronous transfer and asynchronous transfer. Source-synchronous transfer involves sourcing a clock along with the data. Specifically, the timing of data signals transferred from one domain to another is referenced to the clock sourced by the transmitting domain, and not to a global clock. In source-synchronous transfer, any signal propagation delay experienced by the data through a device tracks the delay experienced by the clock through that same device. This comes at the expense of creating separate clock domains at the receiving domain, and thus additional synchronization logic to transfer the received data into the core clock of the receiving domain.

Asynchronous transmission of data occurs without the use of a dedicated clock signal. Any timing required to recover data from the communication symbols is encoded within the symbols. Asynchronous systems can be constructed out of modular functional blocks within an integrated circuit (IC), each module having well-defined communication interfaces. These modules may operate at variable speeds, whether due to data-dependent processing, dynamic voltage scaling, or process variation. The modules can then be combined together to form a working system, without reference to a global clock signal. Typically, low power is obtained since components are activated only on demand.

A specific type of IC is an application specific integrated circuit (ASIC). Such ASICs can provide flexibility to the system design. The ability to integrate millions of gates on an application specific integrated circuit (ASIC) has given rise to the System-on-Chip (SoC), or System-Level-Integration ASIC models. In such models, complex cores can be modularized into many smaller functional pieces. The functional pieces may include clusters of analog and digital logic, conventionally known and referred to herein as logic blocks, or synonymously, "chiplets." A logic block or group of analog or digital circuits is sometimes called a chiplet. A chiplet (or logic block) may define a single module or a collection of modules having a particular physical hierarchy or boundary. Two or more chiplets can be on the same integrated circuit substrate or can be on different substrates. The logic blocks are connectable together in various configurations using data lines or other circuitry. The term "core" refers to each of the various functional blocks that make up an ASIC, and a chiplet can be thought of as a core, or functional block, of relatively low complexity, for example an application or system controller, a debug subsystem, an audio subsystem, an SoC interconnect, a memory, a clock generation unit, or the like. Functional blocks can range in size and complexity from a simple RAM memory core to a much more complex embedded processor core.

BRIEF SUMMARY

Various aspects of the present invention are directed to data communication methods for use in an integrated circuit including multiple chiplets communicatively coupled by data lines having configurable routing and exhibiting propagation delays, the chiplets having respective operating voltages and operating frequencies. Such methods include formatting data signals to compensate for the propagation delays and different operating frequencies between a first chiplet and a second chiplet, changing a signaling voltage level of the formatted data signals from the operating voltage of the first chiplet to the operating voltage of the second chiplet, and transmitting the formatted and changed data signals from the first chiplet to the second chiplet via the data lines. In exemplary embodiments, the integrated circuit is an ASIC.

Various aspects of the present invention are also directed to integrated circuits that include at least a first chiplet and a second chiplet having different operating voltages and different operating frequencies, the first and second chiplets being communicatively coupled by data lines that exhibit propagation delays. Such integrated circuits include a data signal formatting circuit that compensates for the propagation delays and different operating frequencies between the first chiplet and the second chiplet, and a voltage shifting circuit that receives data signals from the formatting circuit and changes a signaling voltage level of the received data signals from the operating voltage of the first chiplet to the operating voltage of the second chiplet, the changed data signals being conditioned for transmitting to the second chiplet.

Various aspects of the present invention are also direct to integrated circuits having a first functional module operable at a first clock frequency and a first voltage, and a second functional module operable at a second clock frequency and a second voltage. In such integrated circuits the first functional module includes a data transforming circuit arranged to transform a first data signal compatible with the first functional module into an outbound data signal compatible with the second functional circuit, wherein the outbound data signal representative of the first data signal. In such integrated circuits the first functional module also includes a voltage transforming circuit arranged to transform the outbound clock signal and the outbound data signal from the first voltage to the second voltage.

The above summary is not intended to describe each embodiment or every implementation of the present disclosure. The figures and detailed description that follow more particularly exemplify various embodiments.

BRIEF DESCRIPTION OF THE SEVERAL VIEWS OF THE DRAWINGS

The invention may be more completely understood in consideration of the following detailed description of various embodiments of the invention in connection with the accompanying drawings, in which.

Figure 1:
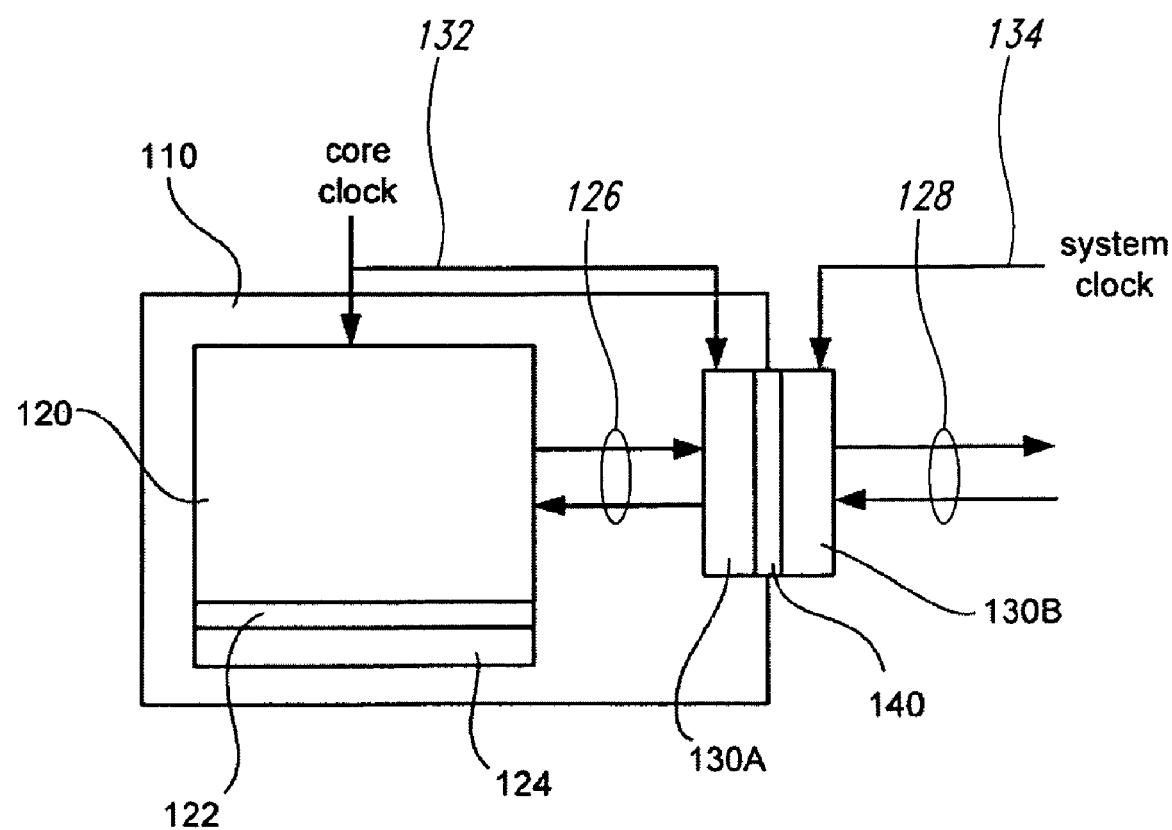
FIG. 1 illustrates an example of a chiplet that can be used to communicate data in accordance with certain embodiments of the present invention.

While the invention is amenable to various modifications and alternative forms, specifics thereof are shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the appended claims. The components in the drawings are not necessarily drawn to scale relative to each other. Like reference numerals designate corresponding parts throughout the several views.

DETAILED DESCRIPTION

Embodiments of the present invention relate to communicating data between domains in an integrated circuit chip. As such, the present invention provides integrated circuits, and methods for use in integrated circuits, having multiple domains operating at respective voltages and frequencies and communicatively coupled by data lines. In certain embodiments, data is communicated from one domain to another by formatting the data signals to compensate for propagation delays and different operating frequencies between the domains, and then changing the voltage level of the formatted data signals from the operating voltage of the transmitting domain to the operating voltage of the receiving domain.

In certain embodiments, propagation delays between domains can be mitigated by combining voltage and frequency domain crossings rather than shifting the voltage level at the boundary of the transmitting domain and then compensating for the frequencies changes. Combining voltage and frequency crossings can have the effect of hiding the time for voltage shifting within the propagation delay. For example, consider an implementation in which the voltage isolation logic (level shifters and clamps) are in the critical data path of a core such that delays due to voltage shifting will slow down the core. In accordance with certain embodiments of the present invention, the voltage level shifters are placed within a source-synchronous or asynchronous crossing so that the voltage shift delay is hidden to mitigate any slow-downs of the core.

In one example, the frequency of the crossing signals is adjusted from the frequency of the source domain to the frequency of the destination domain. Subsequently or concurrently, before the signals are communicated to the destination domain, the voltage of the signals is adjusted from that of the source domain to the voltage of the destination domain. In this way, the propagation delay from the voltage translation is embedded in the critical path of the source-synchronous or asynchronous crossing.

Various embodiments of the present invention can be particularly useful for configurable ICs including, but not limited to, ASICs, field programmable gate arrays (FPGAs) and programmable logic devices (PLDs). The skilled artisan would recognize that various embodiments of the invention can also be particularly useful for non-configurable ICs. For simplicity, the following descriptions do not list each possible type of IC as the skilled artisan would readily recognize the usefulness to various different types of ICs.

In accordance with certain embodiments of the present invention, voltage and frequency domain crossings are combined in an ASIC so that the voltage isolation can be implemented after the data signals have been formatted for transmission to another frequency domain. In one embodiment, an interface circuit formats the data such that the skew that affects any of the signals as they cross the interface is relatively maintained across all signals that cross the interface. Thus, relatively large propagation delays, such as those introduced by the voltage translation, do not adversely affect the communicated data. In a specific instance, the interface circuit uses a protocol that is relatively independent of the propagation delay, thereby facilitating modular use of the interface circuit. This can be particularly useful for simplifying the circuit design process including ASIC-based designs. Implementing a voltage isolation-shift after the formatting occurs allows isolation delays to be embedded in a frequency crossing where such delay is compensated for due to the already-present frequency transitioning and compensation for the propagation delay, for example in source-synchronous links where skew (but not propagation delay) is important. In specific embodiments, the voltage isolation/shifting is implemented using similar logic for each data signal. Thus, any delay associated with the voltage isolation/shifting is seen consistently across the data signals. Accordingly, the voltage isolation/shifting delays can be compensated for using the already-present frequency transitioning and compensation for the propagation delay.

The magnitude of propagation delays can be considered relative to delays within a chiplet. Inside a chiplet, synchronous techniques are used to transfer data, with wire connections being physically constrained (e.g., about 1 mm or less), resulting in delays that are controllable from a general performance standpoint. For communications between chiplets, the wires can be much longer (e.g., in the 1 mm to 10 mm range). Wire delay and buffering for communications between chiplets has been observed to add 1 nanosecond per millimeter of wire length in some 65 nm chip designs.

Placing the adapters in different "islands" allows island boundaries and hierarchy to be clearly defined, with voltage isolation logic residing on the island boundaries rather than being embedded in the middle of the island. This can be particularly useful for mitigating interference from the different voltage supplies and simplifying the design, including routing concerns, of the respective islands.

While it may be illustrative to consider various aspects of the present invention in terms of implementation within an ASIC environment, it will be appreciated from the descriptions provided herein that aspects of the present invention may be useful in other environments now know or later developed. For example, as process technology advances and more circuitry is integrated in SoC's, and as synchronous chips grow larger, propagation delays can be compounded due to increasing interconnect delays due to longer wires, and so forth. Voltage isolation occurring between domains and embedded within frequency crossings in accordance with certain embodiments of the present invention can mitigate propagation delays and allow for increasing circuitry size and/or complexity with reduced impact to system performance characteristics such as speed. As another example, aspects of the present invention can allow integrated circuit subsystems or chiplets to be reused across different circuit designs with little or no negative performance impact to the SoC. In certain circumstances, this can allow multiple chiplets to be developed concurrently and independently with the understanding that a wider array of connectivities are possible with little or no performance impact. In certain embodiments of the present invention, any non-synchronous link can be used to span voltage and clock domains, provided that the level shifters and clamps needed for voltage isolation are embedded in the frequency/clock crossing logic where the propagation delay associated with the voltage isolation does not matter.

FIG. 1 illustrates an example of a processor core domain 110 that includes, for example, a processor 120 regulated by a core clock. Processor 120 may be coupled to a memory 124 via a voltage level shifter 122 that is internal to the domain 110. Signals 126, 128, such as data signals, clock signals, handshake signals, and the like, flow into and out of domain 110 through an adapter 130A, which is shown to reside within the chiplet boundary, and voltage isolation 140, for example voltage level shifters and clamps, that exists at the chiplet boundary. Adapter 130B belongs to another chiplet, a system domain for example, that is in communication with domain 110, along with any remaining voltage level shifters and clamps. A core clock 132 regulates the processor core domain 110 and adapter 130A, and a system clock 134 regulates the other domain (not shown in FIG. 1) and adapter 130B.

As indicated in FIG. 1, frequency and voltage domain crossings are combined by including within the physical chiplet boundary, or logic block boundary, an adapter and voltage isolation. In between the communicating chiplets, a source synchronous or asynchronous communication link is established that does not rely on absolute delays, but rather skew or relative skew between signals. In certain embodiments, the voltage isolation 140 can reside on a chiplet that is on a separate substrate from the chiplet of domain 110 and the chiplet that is in communication with domain 110.

Figure 2:
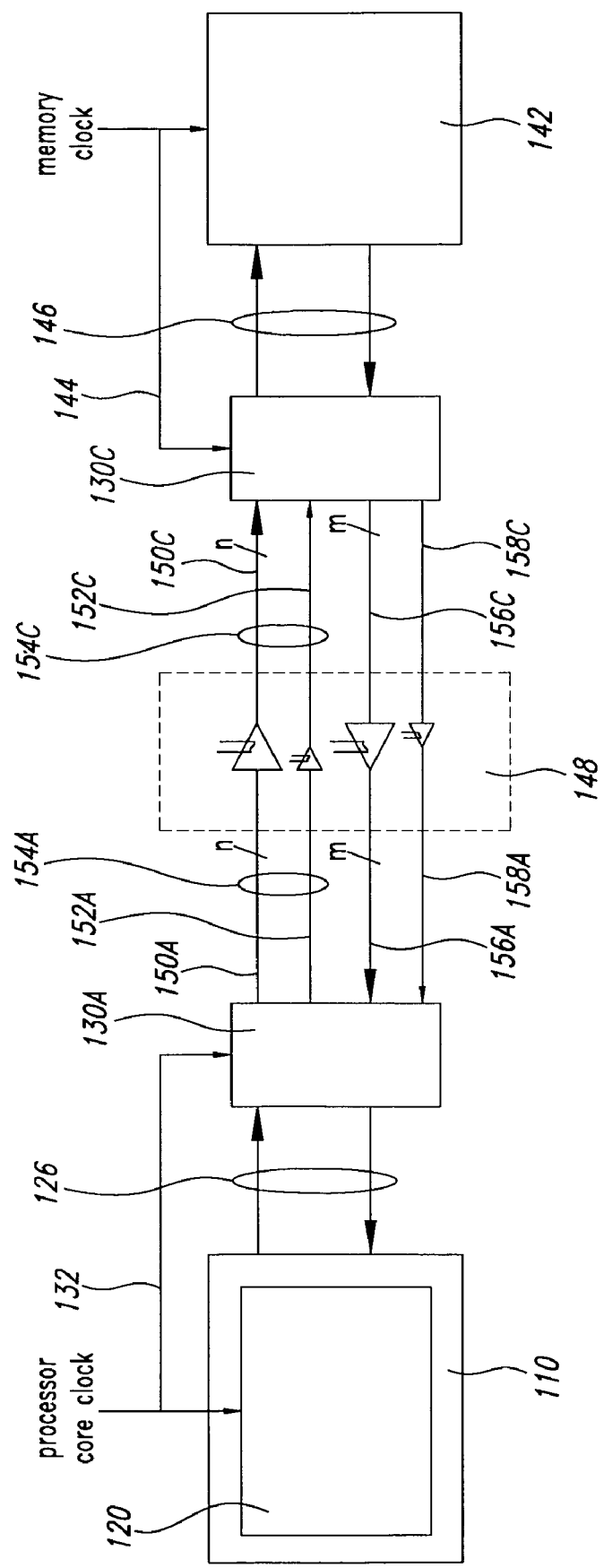
FIG. 2 illustrates exemplary source-synchronous communications in accordance with certain embodiments of the present invention.

FIG. 2 illustrates an example of source-synchronous communication in accordance with certain embodiments of the present invention. In the illustrated example, a processor domain 110 that includes a processor 120 and that is regulated by a core clock 132 is in communication with a memory domain 142 that is regulated by a memory clock 144. The two domains 110 and 142 are each operated at different voltages and different frequencies. Adapter 130A is associated with domain 110, and in certain embodiments can be physically located on an island separate from the chiplet of domain 110. Likewise, adapter 130C is associated with domain 142, and in certain embodiments can be physically located on a substrate separate from the chiplet of domain 142. Signals 126 flow into and out of domain 110 through an adapter 130A, and similarly, signals 146 flow into and out of domain 142. Signals 146 are shown to reside within the chiplet boundary.

Voltage translation 148, which is another embodiment of the voltage translation circuit 14 in FIG. 1, may include isolation, voltage level shifters, clamps, and the like. Voltage translation 148 exists at the chiplet boundary. The voltage isolation circuitry 148 for communication between domains 110 and 142 is situated within the data propagation path and is combined with the frequency crossing as indicated at region 148. The voltage isolation circuitry 148 can be a separate chiplet formed on the same substrate or on different substrates from the processor domain chiplet 110 and the memory domain chiplet 142.

Within region 148, an arrangement of n-bits of core data 150A are formatted to pass through voltage isolation and/or level shifting circuitry. In some cases, the circuitry may additionally perform a clamping function. A core clock 152A, upon which the n-bits of core data are determined, is also formatted to pass through isolation, level shifting circuitry, and/or clamping circuitry. The corresponding n-bits of core data 150C, and core clock 152C are realized after the voltage translation. In some embodiments, the core data 150A and core clock 152A signals are understood to have a cooperative relationship in voltage level and signal skew. Accordingly, the relationship is illustrated as a set of core signals 154A. After translation, a corresponding set of core signals 150C, 152C, and 154C are received at adapter 130C.

In an alternate direction within region 148, an arrangement of m-bits of mem data 156C and a mem clock 158C upon which the m-bits of mem data are determined are formatted. The mem data 156C and mem clock 158C pass through circuitry such that isolation, level shifting, and/or clamping functions are provided to generate mem data signals 156A and mem clock signals 156C. The mem signals flow from the memory domain 142 to the processor domain 110.

The voltage translation circuitry in region 148 is typically derived such that voltages from both domains 110 and 142 can operate over their full range. In some cases, the circuitry is bi-directional. Further, the circuitry is typically designed to maintain as small of a crossover skew as possible on a single path and with consistent, acceptable crossover skew between each of the signals passing through the region 148.

Often, the clamping function in region 148 will be provided such that when power is removed from one domain, the desired voltage level on the other domain will be maintained. The clamping function may be enabled with a control signal or may be automatically detected. Some signals are clamped to the domain source voltage level, other signals are clamped to ground, and still other signals may be disabled altogether by imposing a high impedance state. As indicated in FIG. 2, each chiplet transmits both data signals and a clock signal to the receiving chiplet. The data and clock are both sent using similar interconnection routing such that the propagation delay seen by the data and clock are similar and/or compatible. The receiving chiplet uses the received clock to interpret the received data. The interpreted data can then be stored in a memory (e.g., first-in-first-out (FIFO) buffer) that is accessible according to the receiving chiplet's clock domain. In accordance with embodiments of the present invention, the voltage change is implemented before being received on the receiving chiplet, and so voltage change circuitry is not needed on the receiving side.

While FIG. 2 shows a processor core in communication with a memory core, it will be appreciated that any chiplet to chiplet communications are contemplated where the chiplets can include application or system controllers, processor cores, debug subsystems, audio or video subsystems, SoC interconnects, memory units, clock generation units, and so forth.

Figure 3:
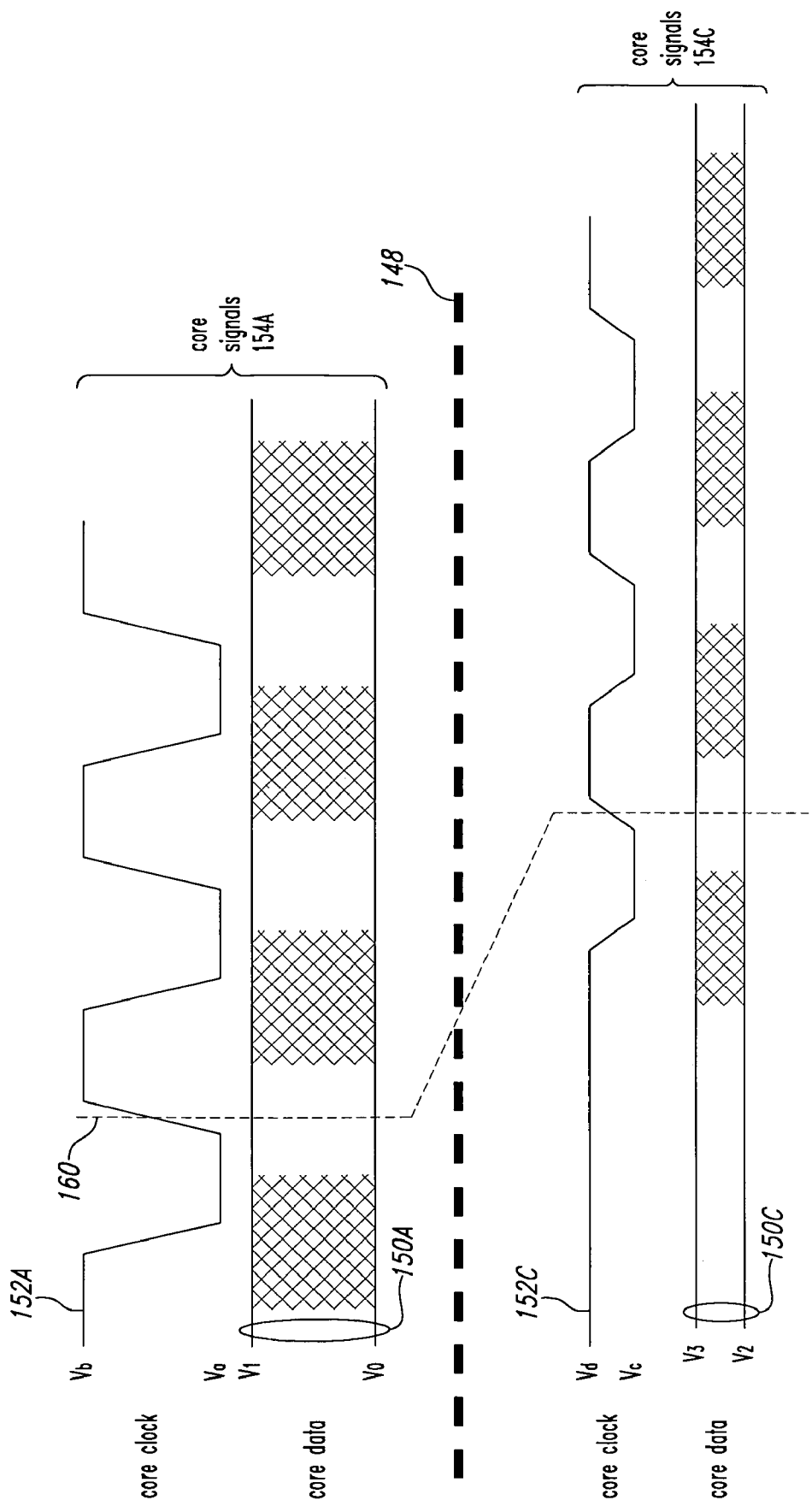
FIG. 3 illustrates exemplary signals formatted to compensate for propagation delays between different functional modules.

FIG. 3 illustrates exemplary core signals formatted to compensate for propagation delays between different functional modules in a source synchronous environment. Data signals from a domain 110 are generated and transformed for passage through a region 148 and into domain 142. The core signals 154A are exemplary signals generated by circuitry within processor domain 110 (FIG. 2), and the core signals 154C are exemplary signals received and processed by circuitry inside memory domain 142 (FIG. 2).

An exaggerated core clock signal 152A is shown in the processor domain signals 154A along with an arrangement of n-bits of core data 150A. The core data bits 150A are permitted to change during some time periods, however, the window of stable core data 150A is formatted such that the center, or eye, of the data window falls at or near the rising edge of the core clock 152A.

As the core data signals 154A cross the domain boundary, through region 148, a propagation delay is introduced by the level shifting circuitry inside region 148. The propagation delay across the formatted signals is indicated by line 160. The voltage translation circuitry in region 148 importantly maintains the skew between the core signals 154A generated in processor domain 110 and core signals 154C received in the memory domain 142 such that the core signals 154C are compatible with the functional circuitry in the memory domain 142.

Figure 4:
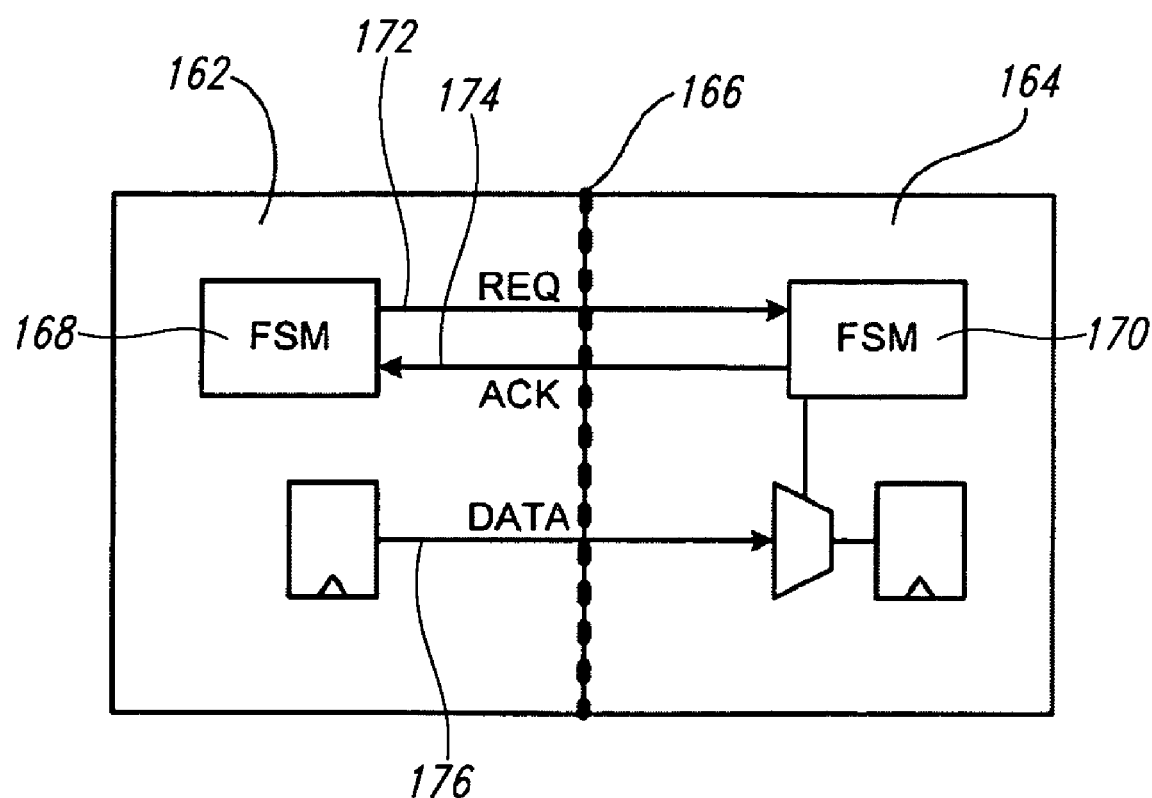
FIG. 4 illustrates exemplary asynchronous communications in accordance with certain embodiments of the present invention.

FIG. 4 illustrates an example of asynchronous communication in accordance with certain embodiments of the present invention. In a specific implementation asynchronous data transfer between two different clock domains, 162 and 164, across a translation or crossing region 166, is facilitated using multiple-flop synchronizers (not shown) and a handshake protocol. Each interface can be implemented with similar, yet independent, synchronization circuits. Finite State Machines (FSMs) 168, 170 can be used to implement the handshakes, for example.

Handshakes provide requests for data (REQ) 172 and/or acknowledgement (ACK) of receipt 174 of data (DATA) 176 transferred between the two clock domains. In some cases, a handshake protocol can be dual phase, wherein a request signal is asserted and response signal is monitored. In other cases, a handshake can be quad phase. In quad phase handshakes, both a request signal and a response signal are asserted and de-asserted. In quad phase handshake protocols, the rising and falling edges of the signal are useful to monitor initiated and completed operations.

As with source-synchronous communications illustrated in the example shown in FIG. 2, voltage isolation occurs at crossing 166 and is embedded in the frequency crossing. Embedding the propagation delays introduced by the voltage translation circuitry within the frequency translation path is advantageous.

When the voltage crossing logic is embedded (or "hidden") in a frequency crossing in accordance with certain embodiments of the present invention, there is no performance degradation by having voltage isolation. Therefore, in certain embodiments of the present invention, all voltage isolation crossings could be implemented in hardware with little or no performance cost, allowing the power hierarchy to be defined in software. In such an implementation, the always-on power domain need not be the highest voltage domain on the chip. As such, voltage islands or logic blocks on the same substrate or different substrates can operate at higher voltages to achieve certain performance characteristic while the always-on domain can operate at a lower level to further reduce, or even minimize, static and dynamic power. In lieu of custom designing certain power relationships in the silicon hardware, all possible relationships are honored because there is little or no performance impact, and software can be used to dynamically regulate which relationships are allowed. In this way, the present invention can be embodied in arrangements that allow for hierarchical design, where the adapters reside in their proper area and the voltage isolation is on the island boundaries.

Figure 5:
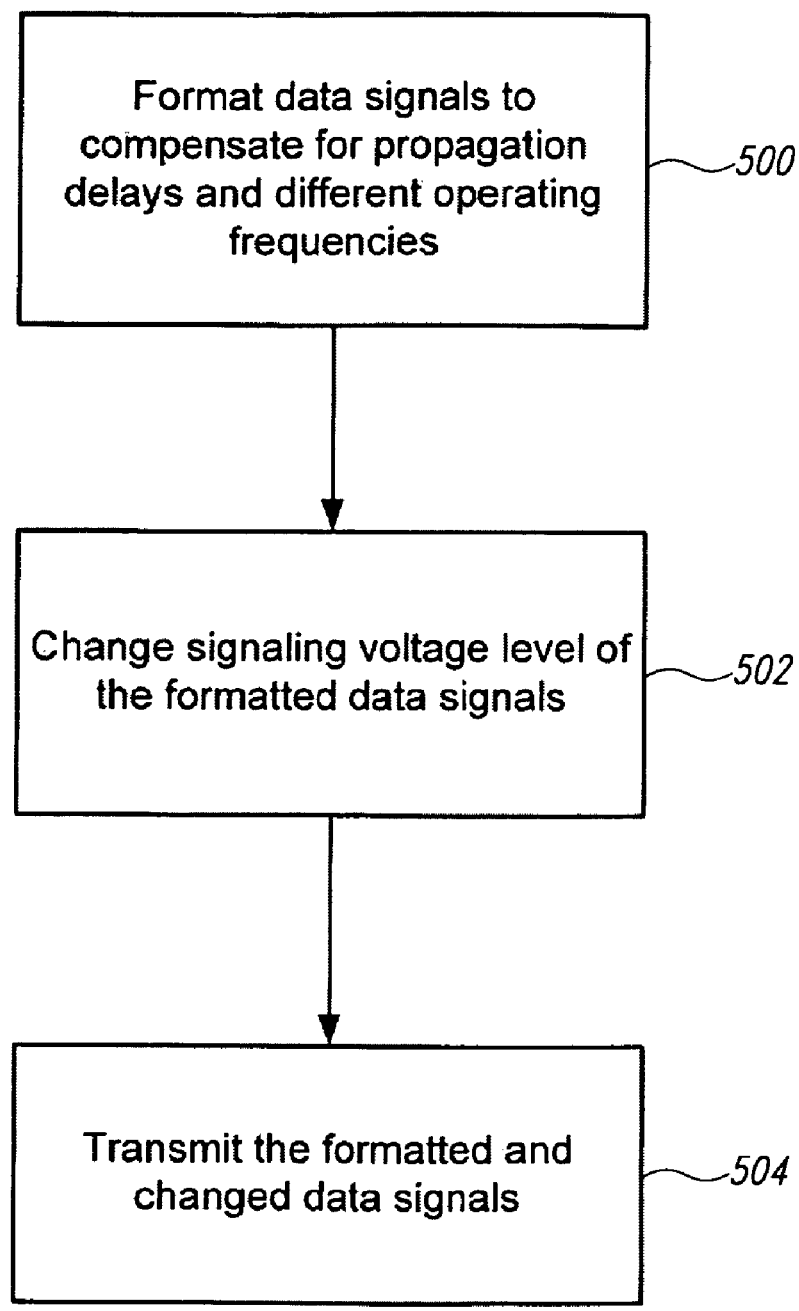
FIG. 5 illustrates a flow diagram of steps that can be implemented in accordance with certain embodiments of the present invention.

By way of summary, FIG. 5 illustrates steps performed in exemplary embodiments of the present invention. When communicating data between chiplets having different operating frequencies and voltages, the data signals are formatted, as shown at 500, to compensate for propagation delays and different operating frequencies between the chiplets. After formatting the data signals, the signaling voltage level of the formatted data signals is changed at box 502 from the voltage level of the transmitting chiplet to the voltage level of the receiving chiplet. The formatted and changed data signals can then be transmitted, as shown in box 504, to the receiving chiplet.

While the present invention has been described above and in the claims that follow, those skilled in the art will recognize that many changes may be made thereto without departing from the spirit and scope of the present invention.

What is claimed is:

1. A method for communicating data from a first logic block to a second logic block, the method comprising:
    formatting data signals to compensate for propagation delays and different operating frequencies between the first logic block and the second logic block;
    changing a signal voltage level of the formatted data signals from an operating voltage of the first logic block to an operating voltage of the second logic block; and
    transmitting the formatted and changed data signals from the first logic block to the second logic block via data lines.

2. The method of claim 1 wherein the first logic block is an application controller, a system controller, a processor core, a debug subsystem, an audio subsystem, a video subsystem, an interconnect, a memory unit, or a clock generation unit.

3. The method of claim 1 wherein formatting data signals comprises:
    generating source-synchronous signals at the operating frequency of the second logic block to obtain an acceptable skew between signals after the source-synchronous signals are generated.

4. The method of claim 1 wherein formatting data signals comprises generating asynchronous signals that maintain the relative skew between the asynchronous signals, the asynchronous signals controlled by one or more handshake signals between the first and second logic blocks.

5. The method of claim 1 wherein the formatting and changing steps are performed on a third logic block coupled between the first and second logic blocks.

6. The method of claim 1 wherein the integrated circuit is an ASIC.

7. The method of claim 1 wherein the integrated circuit comprises programmable logic blocks.

8. The method of claim 1 wherein changing a signaling voltage level of the formatted data signals occurs on a third logic block distinct from the first and second logic blocks.

9. The method of claim 1 wherein formatting data signals to compensate for the propagation delays and different operating frequencies occurs on the first logic block.

10. A circuit comprising:
a first chiplet configured for an operating voltage and an operating frequency;
a second chiplet configured for a different operating voltage and a different operating frequency, the first and second chiplets communicatively coupled by data paths that exhibit propagation delays;
a data signal formatting circuit arranged to compensate for the propagation delays and different operating frequencies between the first chiplet and the second chiplet, the data signal formatting circuit further arranged to maintain an acceptable skew between formatted data signals; and
a voltage shifting circuit arranged to receive the formatted data signals from the formatting circuit and change a signaling voltage level of the formatted data signals from the operating voltage of the first chiplet to the operating voltage of the second chiplet, such that the changed formatted data signals are conditioned for communication to the second chiplet.

11. The circuit of claim 10 wherein the first and second chiplets each comprise one of an application or system controller, a debug subsystem, an audio subsystem, an SoC interconnect, a memory unit, or a clock generation unit.

12. The circuit of claim 10 wherein the first chiplet and the second chiplet are on different substrates.

13. The circuit of claim 10 wherein the first chiplet and the second chiplet are on the same substrate.

14. The integrated circuit of claim 10 wherein the voltage shifting circuit resides on a third chiplet distinct from the first and second chiplets.

15. The integrated circuit of claim 10 wherein the data signal formatting circuit resides on a transmitting one of the first and second chiplets.

16. An integrated circuit having a first logic block, the first logic block operable at a first clock frequency and a first voltage, and a second logic block, the second logic block operable at a second clock frequency and a second voltage, the first logic block comprising:
a data transforming circuit arranged to transform a set of first data signals compatible with the first logic block into a set of outbound data signals compatible with the second logic block, the outbound set of data signals representative of the first set of data signals and an acceptable level of skew between individual signals of the set of outbound data signals; and
a voltage transforming circuit arranged to transform the set of outbound data signals from the first voltage to the second voltage.

17. The integrated circuit of claim 16, further comprising:
a clock transforming circuit arranged to generate an outbound clock signal having a frequency that is operationally equivalent to the second clock frequency.

18. The integrated circuit of claim 16, further comprising:
a finite state machine circuit arranged to handshake request and response signals communicated between the first logic block and the second logic block, the finite state machine further arranged to function in cooperation with the data transforming circuit and the voltage transforming circuit.

19. The integrated circuit of claim 17 wherein the data transforming circuit and the clock transforming circuit have interconnection routing that permits compatible propagation delay of the set of outbound data signals and the outbound clock signal.

20. The integrated circuit of claim 16 wherein the voltage transforming circuit further isolates signals of the first logic block from the second logic block.

21. The integrated circuit of claim 17 wherein the clock transforming circuit is configured to compensate for isolation delays of the voltage transforming circuit.

22. The integrated circuit of claim 16 wherein the voltage transforming circuit resides on a different substrate than the first logic block.

23. The integrated circuit of claim 16 wherein the voltage transforming circuit has a level shifter and a clamp.

* * * * *